United States Patent [19]

Ikegami et al.

[11] 4,366,085

[45] Dec. 28, 1982

[54] FIBROUS ACTIVATED CARBON WITH METAL CHELATE COMPOUND SUPPORTED THEREON, PROCESS FOR PRODUCING THE SAME

[75] Inventors: Shigeru Ikegami, Mishima; Yoshihumi Kawakatsu, Shizuoka; Minoru Hirai, Shizuoka; Kazuo Izumi, Shizuoka, all of Japan

[73] Assignee: Toho Beslon Co., Ltd., Tokyo, Japan

[21] Appl. No.: 207,039

[22] Filed: Nov. 14, 1980

[30] Foreign Application Priority Data

Oct. 30, 1980 [JP] Japan ............... 55/151487

[51] Int. Cl.³ .................................................. B01J 31/12
[52] U.S. Cl. ................................ 252/431 C; 252/428; 252/430; 252/431 N; 252/447; 423/210; 423/219
[58] Field of Search ............... 252/428, 430, 431 C, 252/447, 431 N

[56] References Cited

U.S. PATENT DOCUMENTS 3,793,354  2/1974  Schwager ..................... 252/447

FOREIGN PATENT DOCUMENTS 2049008  4/1972  Fed. Rep. of Germany ...... 252/447
54-119371  9/1979  Japan ................................. 252/447

*Primary Examiner*—John F. Niebling
*Attorney, Agent, or Firm*—Sughrue, Mion, Zinn, Macpeak & Seas

[57] ABSTRACT

A fibrous activated carbon with a metal chelate compound supported thereon which is suitable for removal of toxic substances in gas. This activated carbon is obtained by attaching a solution or dispersion of the metal chelate compound onto the fibrous activated carbon followed by drying. Contacting the activated carbon with a toxic substance-containing gas provides very efficient removal of the toxic substance from the gas.

31 Claims, No Drawings

FIBROUS ACTIVATED CARBON WITH METAL CHELATE COMPOUND SUPPORTED THEREON, PROCESS FOR PRODUCING THE SAME

BACKGROUND OF THE INVENTION

1. Field of the Invention

This invention relates to fibrous activated carbon with a metal chelate compound supported thereon, a process for preparing the same, and a method of using the same. More particularly, it relates to fibrous activated carbon which is suitable for removal of toxic substances contained in gases, particularly ozone, a process for preparing the same, and a method of removing such toxic substances.

2. Description of the Prior Art

Ozone gas present in the air is responsible for air pollution because it produces oxidants in combination with $NO_x$. Furthermore, ozone is produced by air planes flying through the stratosphere, or released from equipment in which corona discharge is involved, such as electrophotographers, ozone sterilizers, etc., equipment employing strong ultraviolet rays, and equipment in which a mercury lamp is used; the thus-produced ozones cause environmental problems.

The adverse influence of these ozones indicated below:

| | Exposure Conc. (ppm) | Exposure Time | Remarks |
|---|---|---|---|
| Damages on plants | 0.03 | 8 hrs | spinach, Japanese radish, tomato |
| Cracks in elongated Rubbers | 0.02 | 1 hr | |
| Perception of odor | 0.02 | only for 5 minutes or less | 90% of people perceive. |
| Sensitivity of test animals on bacterium | 0.08 to 1.30 | 3 hrs | mice |
| Irritation of respiratory organs, oppression of chest | 0.3 | continuous work for about 8 hrs | |
| Reduction of lung function | 0.5 | 3 hrs/day, 6 days/week, 12 weeks | recovery after 6 weeks, no change at 0.2 ppm |
| Reduction in lung breathing capacity | 0.6 to 0.8 | 2 hrs | |
| Increase in Resistance respiratory | 0.1 to 1.0 | 1 hr | |
| Violent coughing, Diffusion of power of attention | 2.0 | 2 hrs | |
| Acute pulmonary tumor | 9.0 | not clear | |

The above results and tests therefore are described in (Kasseitan Kogyo(Activated Carbon Industry), Jukagaku Kogyo Tsushin Sha (1974)).

For the adsorption removal or decomposition removal of ozone contained in exhaust gases or in the air, a number of methods have been proposed, but materials which are very effective for the removal of ozone have not been available. For example, as an ozone removal or dcomposition agent, oxides of manganese, vanadium, iron, copper, nickel, chromium, cobalt, zinc, etc., catalysts prepared by supporting salts of such metals on granular or powdery activated carbon, and decomposition catalysts comprising such metallic elements are known. These agents, however, are low in removal efficiency and are not particularly effective materials as decomposition or removal agents. Additionally, activated carbon with palladium, platinum or silver supported thereon has been proposed. These activated carbons, however, have the disadvantages that the metals are expensive and that the activated carbons are low in ozone removal ratio and limited in durability.

SUMMARY OF THE INVENTION

An object of this invention is to provide a novel fibrous activated carbon and a process for preparing the same.

Another object of this invention is to provide a fibrous activated carbon which is high in the efficiency of removing toxic substances in gases, of long durability, and inexpensive, a process for preparing the same, and a method of using the same.

This invention, therefore, comprises a fibrous activated carbon with a metal chelate compound supported thereon, a process for preparing the same, and a method of using the same.

The activated carbon of this invention can be obtained by attaching a solution or dispersion of a metal chelate compound onto a fibrous activated carbon and then drying.

When brought in contact with a gas containing toxic substances, the fibrous activated carbon of this invention removes the toxic substances from the gas.

DETAILED DESCRIPTION OF THE INVENTION

Metals constituting the metal chelate compounds useful in this invention are desirably selected from Groups Ib, IIa, IIb, VIa, VIIa and VIII of the Periodic Table. In particular, Cu, Ag, Zn, Ca, Cr, Mn, Co, Ni, Pd and Fe are preferred.

Metal chelate compounds are obtained by coordination bonding of metals with a chelating agent, for example, with ethylenediaminetetraacetic acid (hereinafter, referred to simply as "EDTA"), nitrilotriacetic acid (NTA), trans-1,2-cyclohexadiaminetetraacetic acid (cyDTA), diethylenetriaminepentaacetic acid (DTPA), triethylenetetraminehexaacetic acid (TTHA), glycoletherdiaminetetraacetic acid (GETA), iminodiacetic acid (IDA), N,N-ethylenebis(γ-o-hydroxyphenyl)glycine (EHPG), etc.

Fibrous activated carbon as used in this invention can be produced by heretofore known methods. For example, a polyacrylonitrile fiber is made flame-resistant, or a cellulose fiber, a pitch fiber or phenol resin fiber is preliminarily carbonated, and then activated at about 700° C. to about 1,300° C. by use of an activation gas, such as steam, carbon dioxide, ammonia, etc., or mixtures thereof to obtain the corresponding activated carbon.

The concentration of the activation gas is preferably 50 vol% or more and more preferably 80 vol% or more. The processing time is generally from 1 minute to 3 hours.

In this invention, the fibrous activated carbon obtained from polyacrylonitrile is most suitable, and it can be produced as follows:

Acrylonitrile based polymers which can be used as starting materials for the acrylonitrile-based fibrous activated carbon useful in the present invention include acrylonitrile homopolymers and acrylonitrile copolymers. Examples of these copolymers are those containing not less than about 60% by weight, and preferably not less than 85% by weight, acrylonitrile.

Mixtures of homopolymers and copolymers or mixtures of copolymers themselves can be used to produce the fiber. Moreover, copolymers containing less than about 60% by weight acrylonitrile can be used in admixture with acrylonitrile polymers to produce the fiber, if the amount of acrylonitrile in the ultimate fiber exceeds about 60% by weight.

Comonomers which can be introduced into the above copolymers include addition-polymerizable vinyl compounds such as vinyl chloride, vinylidene chloride, vinyl bromide, acrylic acid, methacrylic acid, itaconic acid; the salts (e.g., the sodium salts) of these acids; derivatives of these acids, e.g., acrylic acid esters (e.g., alkyl esters containing 1 to 4 carbon atoms in the alkyl moiety such as methyl acrylate, butyl acrylate, and the like), methacrylic acid esters (e.g., alkyl esters containing 1 to 4 carbon atoms in the alkyl moiety such as methyl methacrylate, and the like); acrylamide, N-methylolacrylamide; allyl sulfonic acid, methallyl sulfonic acid, vinyl sulfonic acid, and the salts (e.g., the sodium salts) of these acids; vinyl acetate; 2-hydroxymethyl-ethyl acrylate, 2-hydroxymethyl-methylacrylate, 2-hydroxyethylacrylate; 2-hydroxyethylmethacrylate; 2-hydroxymethylacrylonitrile, 2-hydroxyethylacrylonitrile; 2-chloroethylacrylate; 2-hydroxy-3-chloropropylacrylate; vinylidene cyanide; α-chloroacrylonitrile; and the like. In addition, those compounds described in U.S. Pat. No. 3,202,640 can be used.

The degree of polymerization of these polymers or polymer mixtures will be sufficient if a fiber can be formed therefrom by conventional techniques, and it is generally about 500 to 3,000, and preferably from 1,000 to 2,000.

These acrylonitrile-based polymers can be produced using hitherto known methods, for example, suspension polymerization or emulsion polymerization in an aqueous system, or solution polymerization in a solvent. These methods are described, for example, in U.S. Pat. Nos. 3,208,962, 3,287,307 and 3,479,312.

Spinning of the acrylonitrile-based polymer can be carried out by hitherto known methods. Examples of spinning solvents which can be used include inorganic solvents such as a concentrated solution of zinc chloride in water, concentrated nitric acid and the like, and organic solvents such as dimethylformamide, dimethylacetamide, dimethyl sulfoxide, and the like.

In particular, when a concentrated solution of zinc chloride in water is used, the residual zinc chloride in the fiber reduces the activation period, and moreover, a fiber having high strength can be obtained.

The diameter of the fiber which can be used in the present invention can be varied, but a suitable diameter is generally from about 5 to 30μ, and preferably from 10 to 20μ, from the standpoint of processing.

Although the oxidation processing in an oxidizing atmosphere is generally carried out in air, any mixture of oxygen and inert gases (such as nitrogen) can be used, provided that they contain oxygen in an amount of not less than about 15 vol%. In addition, the processing can be carried out in an atmosphere of hydrogen chloride gas, sulfur dioxide NO or $NH_3$. In these cases, however, mixtures of these gases and air (with a gas mixture oxygen content of from about 5 to 20 vol%) are generally used.

A suitable oxidation temperature is from about 200° C. to 300° C., and preferably from 200° C. to 280° C. If the temperature is below about 200° C., a long period of time is needed for the oxidation, whereas the temperature is above about 300° C., the fiber will burn or the oxidation will proceed rapidly, thereby making it difficult to achieve uniform oxidation. The temperature can be changed during the oxidation processing. In general, since the rate of oxidation gradually decreases as the reaction proceeds, it is desired to gradually increase the temperature within the range of from about 200° C. to about 300° C.

Preferably, tension is applied in such a manner that the shrinkage at a specific oxidation temperature reaches from about 50% to 90% and, preferably from about 70% to about 85% of the degree of free shrinkage at that temperature. In this case, when the shrinkage is below about 50%, the adsorption property of the filament is insufficient for practical use, whereas when the shrinkage is above about 90%, the mechanical properties of the fiber obtained after the activation processing and reduced.

The term "degree of free shrinkage" as used in the description herein of the present invention designates the ratio of the shrinkage to the original length, that is, when the fiber under a tension of 1 mg/d is allowed to shrink in an oxidizing atmosphere at a specific temperature with oxidation proceeding, the ratio of the shrinkage to the original length is designated as the degree of free shrinkage at that temperature.

To obtain fibrous activated carbon having high adsorption capacities, i.e., an excellent amount of adsorption and rate of adsorption, preferably oxygen is sufficiently bonded at the step of oxidation processing, that is, the oxidation processing is carried out until the amount of bonded oxygen reaches about 50% to about 95% of the saturated amount of bonded oxygen of the fiber. The preferred amount of bonded oxygen is from about 70% to about 90%.

The term "saturated amount of bonded oxygen" is defined as follows: the fiber is oxidized in an oxidizing atmosphere with periodic sampling, and when the change in amount of bonded oxygen of the fiber stops, the amount of the bonded oxygen is determined and designated as the saturated amount of bonded oxygen. This saturated amount of bonded oxygen is determined completely by the polymer composition of the fiber.

The heat treating period in the oxidation processing is determined depending on the processing temperature, and it is generally from about 0.5 hour to 24 hours.

The oxidation processing of the fiber is followed by activation processing.

This activation processing can be accomplished by physical activation or a method comprising impregnating the fiber with an activating agent used in chemical activation and then applying physical activation. These methods are described in U.S. Pat. Nos. 2,790,781 and 2,648,637, for example.

For instance, where the activation is carried out in an activation gas, $CO_2$, $NH_3$, steam or a mixed gas thereof (e.g., $CO_2+H_2O$) is used (in this case, the allowable amount of oxygen can be an extent that the fiber does not burn, and the amount of oxygen is generally not more than 3 vol%). One or more inert gases such as $N_2$, Ar or He may be contained in an activation gas in an amount of up to about 50 vol% (e.g., $CO_2+N_2$, etc.).

The activation is generally carried out at a temperature of about 700° C. to about 1,000° C. for from about 1 minute to about 3 hours.

When the physical activation is applied after impregnation of chemicals, activation chemicals which have hitherto been used in producing activated carbon can be used as these chemicals. For instance, the oxidized fiber can be dipped in an aqueous solution of zinc chloride, phosphoric acid, sulfuric acid, sodium hydroxide, hydrochloric acid, or the like (in the case of hydrochloric acid, generally from about 10 wt% to 37 wt%, and in the case of other chemicals, generally from about 10wt% to 60 wt%). Alternatively, solutions of these materials are sprayed on the fiber to deposit them thereon. Thereafter, the fiber is activated in an activation gas, in general, at about 700° C. to about 1,000° C. for about 1 minute to about 3 hours. In this case, the amount of the chemical (solute) deposited is from about 0.1 wt% to 20 wt% based on the weight of the fiber. Of course, it is possible to deposit an amount of more than 20 wt%, but no special effect due to such a large amount is obtained.

In this activation processing, the fiber is allowed to shrink freely. The shrinkage is generally from about 10% to 30% depending on the particular fiber oxidized.

By this activation, the volatile component of the fiber is removed, and the fiber is carbonized, and at the same time, the specific surface area of the fiber is increased.

Products in the form of a woven fabric, nonwoven fabric, felt, or the like can be produced from the fiber subjected to the oxidation processing, and then activated in the same manner as the fiber.

Fibrous activated carbon may be produced using cellulose as a starting material. In this case, natural cellulose fiber, such as cotton, hemp, and ramie; pulp fiber produced from wood, bamboo and linter; and regenerated cellulose, such as viscose rayon and cuprammonium rayon are used.

The cellulose fiber is treated in an inert gas atmosphere, such as nitrogen and argon or in an oxidizing atmosphere containing oxygen, nitrogen dioxide or sulfur dioxide at 200° to 400° C. to obtain infusible fiber. Prior to the treatment a phosphorous compound or zinc chloride may be adhered to the fiber as a dehydrogenation agent. An ammonium salt may also be used with the above-described dehydrogenation agent.

The thus obtained fiber is subjected to a conventional activation treatment as described hereinbefore.

Fibrous activated carbon can also be obtained from a phenol resin that is, a condensation product of an aldehyde, such as formaldehyde or furfural with a phenol, such as phenol or xylenol, preferably a phenol-formaldehyde resin and a phenol-furfural resin. A phenol-formaldehyde novolak resin is especially preferable for producing fibrous activated carbon.

The resin, for example phenol-formaldehyde novolak resin is subjected to melt spinning, or thin streams of the molten resin are dropped into a stream of a gas, such as air to render the thin stream of the resin to form unhardened novolak resin fiber. Then the thus obtained fiber is subjected to a crosslinking treatment to harden the resin until it becomes to be infusible.

The thus obtained fiber is subjected to a carbonization-activation treatment in air, steam, carbon dioxide or oxygen gas at 200° to 1200° C.

Pitch which is used as a starting material for fibrous activated carbon are obtained from coal or petroleum, or produced as a byproduct in petrochemical industry or organic synthetic chemical industry, or obtained by dry distillation of a synthetic resin or a natural resin.

The pitch is subjected to melt spinning to produce fiber. The thus obtained fiber is treated in an oxidizing atmosphere to obtain infusible fiber. Then the fiber is activated to obtain fibrous activated carbon.

The fibrous activated carbon on which the metal chelate compound is to be supported desirably has a specific surface area, as measured by the BET method, of from about 600 m$^2$/g to 2,000 m$^2$/g, and preferably from about 700 m$^2$/g to 1,500 m$^2$/g. On fibrous activated carbons having specific surface areas of less than about 600 m$^2$/g, the metal chelate compound can be supported only with difficulty, and even if it can be supported the fibrous activated carbon with the metal chelate compound supported thereon is insufficient in the effect of decomposing or removing toxic substances. On the other hand, those fibrous activated carbons having specific surface areas of mor than about 2,000 m$^2$/g are low in strength and are subject to limitations on usefulness.

Further, it is preferred from the standpoint of handling that the fiber strength be more than about 15 kg/mm$^2$, and that the fiber diameter be from 3 to 25 μm. When the fiber strength is less than 15 kg/mm$^2$, various difficulties are encountered in processing. When the fiber diameter is less than 3 μm, the fiber is easily cut during the production of activation carbon, and in molding in a felt form, it is difficult to obtain a web with ease. On the other hand, when the fiber diameter is more than 25 μm, the activation thereof can be attained only with difficulty, and even if it is possible to obtain activated carbon having a predetermined specific surface area, it is difficult to obtain those activated carbons having high strengthes because the activation yield is reduced.

In the fine pore structure of the above described fibrous activated carbon, fine pores having radiuses of 100 Å or less constitute 70% or more of the total fine pores, and they have a pore distriction in which there is a big peak of the single dispersion in the vicinity of radius of 10 Å. Of the fibrous activated carbons with metal chelate compound supported thereon according to this invention, those fibrous activated carbons having a benzene adsorption rate constant of at least 0.2/min are particularly preferred as an agent of removing toxic gases.

The benzene adsorption rate constant is indicated by kCo in the Bohart and Adams' equation: $\log[Co/C-1] = Con - (kCot/2.303)$, described in *Journal of Chemical Physics*, Vol. 15, p. 448 (1947).

In the equation,

Co is the concentration of benzene in gas before processing (predetermined),

C is the concentration of benzene in processed gas after t sec, k is the adsorption rate, Con is a constant, t is the time (sec), and kCo is the adsorption rate constant.

In this invention, the benzene adsorption rate constant is measured as follows: a nitrogen gas containing 100 ppm (Co) of benzene is passed through a 20 mm thick activated carbon layer at a rate of 10 cm/sec at ordinary temperature (25° C.), and according to the above described reference, the benzene adsorption rate constant is determined from a break through curve (curve showing the relation between C and time).

In general, typical granular activated carbon, silica gel, active alumina, etc. have adsorption rate constants of about 0.002/m, and the adsorption rate constant of fibrous activated carbon is 0.05/m or more. This value generally increases when preliminary carbonization is carried out.

When the fibrous activated carbon has a benzene adsorption rate constant of less than 0.2/m, the effect attained by supporting of the metal chelate compound thereon is small. The reason for this is considered that when the benzene adsorption rate constant is less than 0.2/m, there are certain changes in fine pores since the benzene adsorption rate constant is associated with the size, distribution, shape, etc. of fine pores, and the metal chelate compound does not uniformly attach onto the fine pores.

Any fibrous activated carbon meeting with the above described requirements can be used in this invention. In particular, the fibrous activated carbon produced from a polyacrylonitrile fiber is preferred, in that the nitrogen element contained therein, which constitutes from 3 wt% to 15 wt% of the total elemental content, acts in combination with the metal chelate compound supported on the fibrous activated carbon to remove unpleasant gases, etc. more effectively than do the fibrous activated carbons obtained from other starting materials.

The fibrous activated carbon as used in this invention may exist in various forms such as tow, felt, fabric, web, etc.

The metal chelate compound can be supported on the fibrous activated carbon by various methods. Examples of such methods are explained below:

(1) A metal chelate compound is dispersed, preferably dissolved in water or an organic medium which is liquid at ordinary temperature, has a boiling point of not more than 100° C., and is easily driable. Such solvents include, for example, ketones such as acetone, alcohols such as methanol and ethanol, and benzene. The fibrous activated carbon is soaked in the dispersion or solution, or the dispersion or solution is attached on the fibrous activated carbon, e.g., by spraying or immersion and then dried. The concentration of the dispersion or solution is generally from about 0.01 wt% to about 10 wt%, preferably 0.1 to 5 wt%, and pH of the solution is preferred to be adjusted to 4–8. The soaking time is from about 10 minutes to about 5 hours. The drying is carried out at a temperature below the decomposition temperature of the metal chelate compound, and generally at about 200° C. or less.

(2) A solution of a chelating agent is attached onto a fibrous activated carbon and, thereafter, a solution of a metal salt is attached onto the activated carbon and dried to form a metal chelate compound on the activated carbon. The concentration of the chelating agent in the solution (solvents disclosed in (1) may be used) is ordinarily from about 0.01 wt% to 10 wt%, and preferably from 0.1 wt% to 1 wt%, and the concentration of the metal salt in the solution is ordinarily from about 0.01 wt% to 10 wt%, and preferably from 0.1 wt% to 1 wt%. The amount of the chelating agent to be attached is about 1 to 2 equivalents per 1 equivalent of the metal salt. Any methods such as soaking, spraying, etc. can be used for the attachment.

In any of the above described methods, the amount of the metal chelate compound being supported is controlled by the concentration of the solution in which the fibrous activated carbon is soaked or which is to be sprayed, the soaking time, and the amount of the solution sprayed. Where the activated carbon is soaked in the solution or dispersion in the above operation, the ratio (by volume) of the activated carbon to the dispersion or solution is generally from 1:10 to 1:200.

While the metal chelate compound can be supported on the fibrous activated carbon in an amount up to about 50% by weight, based on the total weight of the final product, when the final product is used as an agent of removing the above described gases, it is preferably supported in an amount of from about 0.01% by weight to 30% by weight, and preferably from about 0.1% by weight to 20% by weight. When it is supported in amounts less than 0.01% by weight, the effect as a removal agent is insufficient, whereas in amounts greater than 30% by weight, the apparent specific surface areas lowers and the effect suddenly decreases.

The metal chelate compound is deposited on the activated carbon so that the resulting specific surface area preferably be 500 m²/g or more, more preferably 800 m²g or more. The benzene adsorption rate constant of the fibrous activated carbon substantially does not change by supporting the metal chelate compound thereon.

In this invention, two or more metal chelate compounds may be used in combination with each another.

The thus obtained fibrous activated carbon has substantially the same fiber strength, diameter and benzene adsorption rate as the fibrous activated carbon which was used as a starting material, that is, the fibrous activated carbon with a metal chelate compound supported thereon has a fiber strength of 15 kg/mm² or more, a fiber diameter of about 3μ to about 25μ, and a benzene adsorption rate constant of at least of 0.2/min.

In comparison with typical adsorbents, such as granular or powdery activated carbon, silica gel, acid clay, alumina, etc., with metals supported thereon in the form of a metallic element or metal compound, the present fibrous activated carbon with the metal chelate compound supported thereon shows a significant increase in the ozone decomposition efficiency and lengthened durability for removal of toxic substances.

The fibrous activated carbon with the metal chelate compound supported thereon can be used not only for decomposition and removal of ozone, but also for the decomposition and removal of gases having unpleasant odor, such as hydrogen sulfide, sulfurous acid gas, mercaptan compounds, etc. The present fibrous activated carbon with the metal chelate compound supported thereon adsorbs the above substances and at the same time, decomposes them, converting them into other substances. It is considered that, ozone in gases becomes normal molecular oxygen, and hydrogen sulfide and sulfurous acid gases are converted into sulfuric acid in the presence of water (in general, the water in the air is sufficient), and when a mercaptan compound to be removed by the present fibrous activated carbon is represented, for example, by RSH, it is converted into a compound represented by RSSR in the presence of oxygen (in general, the oxygen in the air is sufficient). R in the above formulae is typically a straight or branched alkyl group containing from 1 to 4 carbon atoms, and may be substituted.

In order for the fibrous activated carbon with the metal chelate compound supported thereon to be used as an agent for removing toxic gases, it is brought into contact with such gases. In general, passing the gases through a layer composed of the fibrous activated carbon increases the removal efficiency. The activated carbon is packed, for example, in a glass column or used in a felt form. The present activated carbon can be molded in combination with pulp in a honey comb form, or it can be cut into a length of 0.1 mm or less and adhered onto a support on which a binder has been provided.

The temperature at which the present fibrous activated carbon with the metal chelate compound supported thereon is used to remove toxic gases is less than the decomposition temperature of the metal chelate compound. In general, a temperature of from about 20° C. to 100° C., and preferably from 25° C. to 50° C.

In case that ozone is adsorbed, the used activated carbon can be reused after desorption of the ozone, but since it is not toxic, it may be disposed. Where sulfuric acid is formed on the activated carbon by adsorption of hydrogen sulfide or sulfurous acid gases, it can be re-used by regeneration through water-washing. Where RSSR is formed by adsorption of RSH, the activated carbon can be reused by desorption.

The following examples and comparative examples are given to illustrate this invention in greater detail.

EXAMPLE 1

An acrylonitrile fiber consisting of 90% by weight of acrylonitrile and 10% by weight of methyl acrylate was made flame-resistant by heating in air at from 230° C. to 250° C. for 6 hours under tension so as to provide a shrinkage of 67% of the free shrinkage, and then processed in steam at 900° C. for 10 minutes to obtain a fibrous activated carbon having a specific surface area of 1,200 $m^2/g$. With the thus obtained fibrous activated carbon, the nitrogen content was 4 wt%, the fiber strength, 251 g/$mm^2$, the diameter, 5$\mu$, and the benzene adsorption rate constant, 0.6/min.

The fibrous active carbon was soaked in a 0.8% by weight aqueous solution of EDTA-Cu (II) chelate compound at 25° C. for 20 minutes (bath ratio; volume of fibrous activated carbon: volume of solution = 1:100) and then dried at 100° C. for 1 hour to obtain a fibrous activated carbon with 12% by weight of the metal chelate compound supported thereon. The fibrous activated carbon so obtained in the amount of 0.05 g was packed in a glass column with a diameter of 35 mm in a packing density of 0.03 g/$cm^3$.

Then air containing 2 ppm of ozone (RH 65%, Temp. 25° C.) was passed through the activated carbon layer at a flow rate of 0.023 $m^3$/min. After 50 minutes from the start of adsorption decomposition, the ozone decomposition ratio was 100%, and after 60 minutes, it decreased to 95%.

On the other hand, assuming that the ozone was not decomposed but adsorbed as it is, the effective adsorption amount was measured and found to be 11.7%. The effective adsorption amount is an adsorption amount until the gas having a concentration of 5 wt% of the original concentration comes out without being adsorbed.

COMPARATIVE EXAMPLE 1

By using the same fibrous activated carbon as in Example 1, except that no metal chelate compound was supported thereon, adsorption-decomposition of ozone was carried out by the same procedure and under the same conditions as in Example 1. During 5 minutes after the start of adsorption, 100% of the ozone was adsorbed. After 8 minutes, the effective adsorption amount was measured and found to be only 1.5%.

COMPARATIVE EXAMPLE 2

On granular activated carbon obtained from coal and having a grain size of 8-10 mesh and a specific surface area of 1050 $m^2/g$, EDTA-Cu (II) chelate compound was supported in an amount of 12 wt%.

The thus obtained activated carbon was packed in a glass column with a diameter of 35 mm in a packing height of 40 mm. Then air containing 2 ppm of ozone (RH 65%, Temp. 25° C.) was passed through the activated carbon layer at a flow rate of 0.023 $m^3$/min.

After 30 minutes from the start of adsorption decomposition, the ozone decomposition ratio was 95%, and then the decomposition rate is decreased rapidly.

Assuming that the ozone was not decomposed but adsorbed as it is, the effective adsorption amount was measured and found to be 0.047%.

EXAMPLE 2

Rayon was soaked in a 2% aqueous solution of ammonium hydrogenphosphate (carbonization accelerator) at 20° C. for 1 hour, dried at 100° C. for 1 hour, heat-treated at 260° C. in air for 2 hours, raised in temperature to 850° C., and activated for 30 minutes while introducing steam. The thus obtained fibrous activated carbon had a specific surface area of 1,300 $m^2/g$, a strength of 18 kg/$mm^2$, a diameter of 20$\mu$ and a benzene adsorption rate constant of 0.5/min.

The thus-obtained fibrous activated carbon was soaked in a 1% aqueous solution of EDTA-Zn chelate compound (bath ratio; 1:100) at 20° C. for 20 minutes and then dried at 100° C. for 1 hour to obtain a fibrous active carbon with the metal chelate compound supported thereon in a ratio of 5 wt%. The fibrous activated carbon in the amount of 0.1 g was packed in a glass column of a diameter of 35 mm in a packing density of 0.05 g/$cm^3$. Through the activated carbon layer was passed through air (relative humidity 60%, temperature 22° C.) containing 1 ppm of ozone at a flow rate of 0.029 $m^3$/min.

During 160 minutes after the start of absorption-decomposition, the decomposition ratio was 100%, and 10 minutes later, it decreased to 95%. Assuming that the ozone was not decomposed but adsorbed, the effective adsorption amount was measured and found to be 9.8%.

COMPARATIVE EXAMPLE 3

The procedure of Example 2 was repeated except that an EDTA-Zn chelate compound was supported in a ratio of 37% by weight.

During 3 minutes after the start of adsorption, 100% of the ozone was adsorbed, and 5 minutes later, ozone in a concentration of 5% of the original one came out without being adsorbed. The effective adsorption amount was measured and found to be 0.29%.

From this experiment, it can be seen that when the amount of the metal chelate compound supported exceeds 30 wt%, the decomposition-removal efficiency of the ozone suddenly decreases.

EXAMPLE 3

On the same fibrous activated carbon as used in Example 1 were supported the metal chelate compounds as illustrated in Table 1 in a ratio of 6% by weight to produce the corresponding fibrous activated carbon with the metal chelate compound supported thereon.

By using the fibrous activated carbon so-obtained, adsorption-decomposition of ozone was carried out in the same manner as in Example 1. Assuming that the ozone was adsorbed, the effective adsorption amount was measured. The results are shown in Table 1.

TABLE 1

| Run No. | Metal Chelate Compound | Effective Adsorption Amount (%) |
| --- | --- | --- |
| 1 | EDTA—Ni (II) | 12.7 |
| 2 | EDTA—Zn (II) | 14.6 |
| 3 | DTPA—Cu (II) | 15.0 |
| 4 | IDA—Ni (II) | 12.5 |
| 5 | NTA—Cu (II) | 13.2 |
| 6 | EDTA—Fe (III) | 7.7 |
| 7 | GETA—Mn (II) | 15.1 |
| 8 | EHPG—Mn (II) | 14.1 |
| 9 | CyDTA—Cr (III) | 9.4 |
| 10 | EDTA—Co (II) | 9.6 |
| 11 | TTHA—Co (II) | 12.2 |
| 12 | EDTA—Fe (II) | 15.2 |

EXAMPLE 4

The fibrous activated carbon obtained in Example 1 was soaked in a 1.5 wt% aqueous solution of EDTA-Co (bath ratio, 1:100) at 25° C. for 15 minutes and then dried at 100° C. for 1 hour to obtain a fibrous activated carbon with 6.5% of EDTA-Co supported thereon. The thus obtained fibrous activated carbon in the amount of 0.5 g was packed in a glass column of a diameter of 20 mm in a packing density of 0.03 g/cm$^3$. Through the activated carbon layer was passed through a mixed gas containing 1,000 ppm of $SO_2$, 7% of $O_2$ and 5.5% of $H_2O$, the remainder being nitrogen, at a flow rate of 0.011 m$^3$/min and an adsorption temperature of 80° C. for 5 hours.

At the same time, a fibrous activated carbon with no metal chelate compound supported thereon was prepared and compared with the above-prepared activated carbon. Assuming that $SO_2$ was adsorbed, the following results were obtained.

| | Absorbed Amount of $SO_2$ per Gram of Activated Carbon |
| --- | --- |
| This Invention | 0.45 g |
| Comparative Example | 0.05 g |

EXAMPLE 5

The fibrous activated carbon as obtained in Example 1 was soaked in a 5 wt% aqueous solution of EDTA-Mn (bath ratio, 1:100) at 20° C. for 10 minutes and then dried at 100° C. for 1 hour to obtain a fibrous activated carbon with EDTA-Mn supported thereon in a ratio of 7 wt%. The thus-obtained activated carbon in the amount of 0.15 g was packed in a glass column of an inner diameter of 35 mm in a packing density of 0.03 g/cm$^3$. Nitrogen gas containing 2 ppm of methylmercaptan was passed through activated carbon layer at 25° C. and a flow rate of 0.023 m$^3$/min.

It took 580 minutes until the outlet concentration of methylmercaptan reached 5% of the intake concentration. On the other hand, with a fibrous activated carbon with no metal chelate compound deposited thereon, the outlet concentration reached 5% of the intake concentration in 14 minutes.

EXAMPLE 6

A mixture consisting of 60% by weight of the fibrous activated carbon with EDTA-Cu (II) deposited thereon as obtained in Example 1 and 40% by weight of pulp was dispersed in water so that the concentration of the mixture in water be 0.5% by weight, and the resulting dispersion was processed by a Fourdrinier paper machine to produce a fibrous activated carbon paper of 50 g/m$^2$.

This fibrous activated carbon paper was corrugated and bonded with a flat sheet to prepare a cardboard (height: 2 mm; pitch: 3 mm). The cardboard so obtained was trimmed to a size of a width of 15 mm and a length of 150 cm and winded in a honeycomb form. This honeycomb-like cassete was attached to an exhaust fan outlet of an electrophotographic business copying machine in such a manner that exhaust gas were allowed to pass through honeycomb-like holes as a parallel flow, to remove an ozone gas coming from the copying machine.

When the exhaust gas containing 1.1 ppm of ozone was passed through the honeycomb-like cassette at an exhaust amount of 0.99 m$^3$/min, and a temperature of 40° C., the outlet concentration of ozone was 0.1 ppm even after a lapse of 100 hours, and thus it exhibited an excellent ozone removal effect.

EXAMPLE 7

EDTA was dispersed in 1 wt% aqueous solution of copper chloride in an equimolar amount to copper chloride, and the pH of the resulting mixture was adjusted to 4.5 by adding 1/10 N caustic soda.

A fibrous activated carbon (specific surface area: 1,000 m$^2$/g; strength: 20 kg/mm$^2$; benzene adsorption rate constant: 0.3/min) was soaked at 25° C. in the above prepared 0.9 wt% aqueous solution of the metal chelate compound (bath ratio: 1:100) for 30 minutes, taken out from the solution, dehydrated and dried at 100° C. for 1 hour to obtain a fibrous activated carbon with the metal chelate compound supported thereon in an amount of 5% by weight.

By using the thus-obtained fibrous activated carbon, the adsorption test was carried out in the same manner as in Example 1, and results substantially similar to those in Example 1 were obtained.

EXAMPLE 8

A 1 wt% aqueous solution of EDTA was prepared and adjusted to pH 6 by adding 1 wt% caustic soda. In this aqueous solution a fibrous activated carbon as used in Example 1 was soaked at a bath ratio of 1:100 and a temperature of 25° C. for 60 minutes to support the EDTA thereon. The activated carbon with EDTA supported thereon was dehydrated and then soaked in a 2% aqueous solution of manganese chloride at a bath ratio of 1:100 and a temperature of 25° C. for 30 minutes and dried at 100° C. for 60 minutes to obtain a fibrous activated carbon with the metal chelate compound supported thereon.

By using the thus-obtained fibrous activated carbon, the adsorption test was carried out in the same manner as in Example 5, and results substantially similar to those in Example 5 were obtained.

EXAMPLE 9

A fibrous activated carbon obtained in Example 1 was soaked in an acetone solution containing 1 wt% EDTA. After evaporating of acetone from the fibrous activated carbon, the fibrous activated carbon was soaked in 2 wt% $CuCl_2$ aqueous solution for 30 minutes, taken out from the solution, dehydrated and dried at 100° C. for 1 hour to obtain a fibrous activated carbon with the metal chelate compound (EDTA-Cu (II)) supported thereon in an amount of 11 wt%.

By using the thus-obtained fibrous activated carbon the adsorption test was carried out in the same manner as in Example 1.

Assuming that the ozone was not decomposed but adsorbed as it is, the effective adsorption amount was measured and found to be 11.5%.

While the invention has been described in detail and with reference to specific embodiments thereof, it will be apparent to one skilled in the art that various changes and modifications can be made therein without departing from the spirit and scope thereof.

What is claimed is:

1. Fibrous activated carbon with a metal chelate compound supported thereon, wherein the specific surface area of the fibrous activated carbon with the metal chelate compound supported thereon is at least about 500 m$^2$/g.

2. Fibrous activated carbon as in claim 1 wherein the metal chelate comprises at least one metal selected from Groups Ib, IIa, IIb, VIa, VIIa and VIII of the Periodic Table.

3. Fibrous activated carbon as in claim 1 wherein the metal chelate comprises at least one metal selected from the group consisting of Cu, Ag, Zn, Ca, Cr, Mn, Co, Ni, Pd and Fe.

4. Fibrous activated carbon as in claim 1 wherein the chelate is derived from at least one chelating agent selected from the group consisting of ethylenediaminetetraacetic acid, nitrilotriacetic acid, trans-1,2-cyclohexadiaminetetraacetic acid, diethylenetriaminepentaacetic acid, triethylenetetraminehexaacetic acid, glycoletherdiaminetetraacetic acid, iminodiacetic acid, and N,N-ethylenebis($\gamma$-o-hydroxyphenyl)glycine.

5. Fibrous activated carbon as in claim 1 wherein the benzene adsorption rate constant of the fibrous activated carbon is at least 0.2/min.

6. Fibrous activated carbon as in claim 1 wherein the fiber strength of the fibrous activated carbon is at least 15 kg/mm$^2$.

7. Fibrous activated carbon as in claim 1 wherein the diameter of the fibrous activated carbon is about 3$\mu$ to about 25$\mu$.

8. Fibrous activated carbon as in claim 1 wherein the amount of the metal chelate compound supported is from 0.01% to 30% by weight, based on the total weight of the fibrous activated carbon and the metal chelate compound supported thereon.

9. Fibrous activated carbon as in claim 1 wherein the fibrous activated carbon is an activated carbon obtained from a polyacrylonitrile fiber.

10. A process for producing fiberous activated carbon with a metal chelate compound supported thereon which comprises attaching a solution of dispersion of the metal chelate compound onto fibrous activated carbon and then drying, wherein the specific surface area of the fibrous activated carbon with the metal chelate compound supported thereon is at least about 500 m$^2$/g.

11. A process as in claim 10 wherein the metal chelate comprises at least one metal selected from Groups Ib, IIa, IIb, VIa, VIIa and VIII of the Periodic Table.

12. A process as in claim 10 wherein the metal chelate comprises at least one metal selected from the group consisting of Cu, Ag, Zn, Ca, Cr, Mn, Co, Ni, Pd and Fe.

13. A process as in claim 10 wherein the metal chelate comprises at least one chelating agent selected from the group consisting of ethylenediaminetetraacetic acid, nitrilotriacetic acid, trans-1,2-cyclohexadiaminetetraacetic acid, diethylenetriaminepentaacetic acid, triethylenetetraminehexaacetic acid, glycoletherdiaminetetraacetic acid, iminodiacetic acid and N,N-ethylene-bis($\gamma$-o-hydroxyphenyl)glycine.

14. A process as in claim 10 wherein the solution of the metal chelate compound is adjusted to a pH of from 4 to 8 by use of an alkaline aqueous solution.

15. A process for producing fibrous activated carbon with a metal chelate compound supported thereon, comprising attaching a solution of a chelating agent into fibrous activated carbon, then attaching a solution of a metal onto the fibrous activated carbon, and drying, wherein the specific surface area of the fibrous activated carbon with the metal chelate compound supported thereon is at least about 500 m$^2$/g.

16. A process as in claim 15 wherein the concentration of the chelating agent in the solution is from about 0.01 wt% to 10 wt%, and the concentration of the metal salt in the aqueous solution is from about 0.01 wt% to 10 wt%.

17. An agent for removal of toxic substances in gas, which comprises a fibrous activated carbon with a metal chelate compound supported thereon, wherein the specific surface area of the fibrous activated carbon with the metal chelate compound supported thereon is at least about 500 m$^2$/g.

18. A process as in claim 10 or 14 wherein the ratio by volume of the activated carbon to the dispersion or solution of metal chelate compound is from 1:10 to 1:200.

19. A fibrous activated carbon as in claim 1 wherein the amount of metal chelate compound supported is from 0.1 to 20% by weight, based on the total weight of the fibrous activated carbon and the metal chelate compound supported thereon.

20. A fibrous activated carbon as in claim 1 wherein the specific surface area of the fibrous activated carbon with metal chelate compound supported thereon is more than 800 m$^2$/g.

21. The process of claim 10, wherein the amount of metal chelate compound supported is from 0.1 to 20 wt%, based on a total weight of the fibrous activated carbon and the metal chelate compound supported thereon.

22. The process of claim 15, wherein the amount of metal chelate compound supported is from 0.1 to 20 wt%, based on a total weight of the fibrous activated carbon and the metal chelate compound supported therein.

23. The agent of claim 17, wherein the amount of metal chelate compound supported is from 0.1 to 20 wt%, based on a total weight of the fibrous activated carbon and the metal chelate compound supported thereon.

24. The agent of claim 17, wherein the metal chelate comprises at least one metal selected from Groups Ib, IIa, IIb, VIa, VIIa, and VIII of the Periodic Table.

25. The agent of claim 17, wherein the metal chelate comprises at least one metal selected from the group consisting of Cu, Ag, Zn, Ca, Cr, Mn, Co, Ni, Pd and Fe.

26. The agent of claim 17, wherein the chelate is derived from at least one chelating agent selected from the group consisting of ethylenediaminetetraacetic acid, nitrilotriacetic acid, trans-1,2-cyclohexadiaminetetraacetic acid, diethylenetriaminepentaacetic acid, triethylenetetraminehexaacetic acid, glycoletherdiaminetetraacetic acid, iminodiacetic acid, and N,N-ethylenebis(γ-o-hydroxyphenyl)glycine.

27. The agent of claim 17, wherein the benzene adsorption rate constant of the fibrous activated carbon is at least 0.2/min.

28. The agent of claim 17, wherein the fiber strength of the fibrous activated carbon is at least 15 kg/mm$^2$.

29. The agent of claim 17, wherein the diameter of the fibrous activated carbon is about 3μ to about 25μ.

30. The agent of claim 17, wherein the amount of the metal chelate compound supported is from 0.01% to 30% by weight, based on the total weight of the fibrous activated carbon and the metal chelate compound supported thereon.

31. The agent of claim 17, wherein the fibrous activated carbon is an activated carbon obtained from a polyacrylonitrile fiber.

* * * * *